United States Patent
Akada et al.

(10) Patent No.: US 10,577,276 B2
(45) Date of Patent: Mar. 3, 2020

(54) ULTRAVIOLET-ABSORBENT GLASS

(71) Applicant: AGC INC., Chiyoda-ku (JP)

(72) Inventors: Shuichi Akada, Tokyo (JP); Soshi Watanabe, Tokyo (JP)

(73) Assignee: AGC INC., Chiyoda-ku (JP)

( * ) Notice: Subject to any disclaimer, the term of this patent is extended or adjusted under 35 U.S.C. 154(b) by 0 days.

(21) Appl. No.: 16/033,646

(22) Filed: Jul. 12, 2018

(65) Prior Publication Data

US 2018/0319699 A1 Nov. 8, 2018

Related U.S. Application Data

(63) Continuation of application No. PCT/JP2017/001705, filed on Jan. 19, 2017.

(30) Foreign Application Priority Data

Jan. 20, 2016 (JP) .................................. 2016-008693
Apr. 27, 2016 (JP) .................................. 2016-088822

(51) Int. Cl.
C03C 3/087 (2006.01)
C03C 4/08 (2006.01)
C03C 3/078 (2006.01)

(52) U.S. Cl.
CPC .............. *C03C 3/087* (2013.01); *C03C 3/078* (2013.01); *C03C 4/08* (2013.01); *C03C 4/085* (2013.01)

(58) Field of Classification Search
CPC .................................. C03C 3/087; C03C 4/085
See application file for complete search history.

(56) References Cited

U.S. PATENT DOCUMENTS

| | | | |
|---|---|---|---|
| 5,780,372 A | 7/1998 | Higby | |
| 5,837,629 A | 11/1998 | Combes et al. | |
| 5,905,047 A | 5/1999 | Sasage et al. | |
| 6,071,840 A | 6/2000 | Sasage et al. | |
| 6,287,998 B1 | 9/2001 | Seto et al. | |
| RE37,514 E | 1/2002 | Sasage et al. | |
| 6,395,660 B1 | 5/2002 | Seto et al. | |
| 6,413,893 B1 | 7/2002 | Shelestak et al. | |
| 2002/0155939 A1 | 10/2002 | Seto et al. | |
| 2004/0038799 A1 | 2/2004 | Landa et al. | |
| 2004/0186002 A1 | 9/2004 | Seto et al. | |
| 2016/0229735 A1* | 8/2016 | Akada | ...................... C03C 3/087 |
| 2017/0174552 A1* | 6/2017 | Akada | ...................... C03C 3/087 |
| 2017/0174553 A1* | 6/2017 | Akada | ...................... C03C 3/087 |
| 2018/0072611 A1* | 3/2018 | Akada | ...................... C03C 3/087 |

FOREIGN PATENT DOCUMENTS

| | | | |
|---|---|---|---|
| JP | 8-245238 | 9/1996 | |
| JP | 9-502420 | 3/1997 | |
| JP | 9-315835 | 12/1997 | |
| JP | 10-114540 | 5/1998 | |
| JP | 2000-247679 | 9/2000 | |
| JP | 2000247679 A * | 9/2000 | ............. C03C 3/078 |
| JP | 2003-508338 | 3/2003 | |
| WO | WO 97/17303 A1 | 5/1997 | |
| WO | WO 2015/088026 A1 | 6/2015 | |
| WO | WO-2016039251 A1 * | 3/2016 | ............. C03C 3/087 |
| WO | WO-2016039252 A1 * | 3/2016 | ............. C03C 3/087 |
| WO | WO-2017150684 A1 * | 9/2017 | ............. C03C 3/087 |
| WO | WO-2017209148 A1 * | 12/2017 | ................ B60J 1/00 |
| WO | WO-2017217324 A1 * | 12/2017 | ................ B60J 1/00 |

OTHER PUBLICATIONS

International Search Report dated Apr. 11, 2017 in PCT/JP2017/001705, filed on Jan. 19, 2017 ( with English Translation).
Written Opinion dated Apr. 11, 2017 in PCT/JP2017/001705, filed on Jan. 19, 2017.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

The purpose of the present invention is to provide an ultraviolet-absorbent glass that is suitable as a dark gray glass, that has a very low ultraviolet transmittance (TUV), and that has excellent color rendering properties for green. The present invention relates to an ultraviolet-absorbent glass in which: the ultraviolet transmittance (TUV) as defined in ISO 9050:2003 is 2% or less for a thickness of 2.8 mm; the visible light transmittance (TVA) based on a standard A light source is 10% to 30% inclusive for a thickness of 2.8 mm; the energy transmittance (TE) as defined in JIS R 3106:1998 is 30% or less for a thickness of 2.8 mm; a ratio R14/R9 for color rendering indices as defined in ISO 9050:1990 and JIS Z 8726:1990 is 1.8 or greater; and a ratio R14/R1 is 1.05 or greater.

12 Claims, No Drawings

ULTRAVIOLET-ABSORBENT GLASS

TECHNICAL FIELD

The present invention relates to an ultraviolet absorbing glass that is suitable as dark gray-colored glass for vehicles (particularly for automobiles).

BACKGROUND ART

As rear-side glass and rear glass for automobiles, dark gray-colored glass having a significantly-reduced visible light transmittance (so-called dark gray glass or privacy glass) has been put into practical use. This privacy glass is excellent in indoor comfort and reduction of air-conditioning loads due to favorable sunlight shielding performance in a wide wavelength region from an ultraviolet region through an infrared region, and is excellent in terms of possible options of color tone imparting luxury feelings, designability that is excellent from the design viewpoint, in-vehicle privacy protection, and the like.

In recent years, an interest in ultraviolet countermeasures is increasing. To respond to this, privacy glass having a lower ultraviolet transmittance (TUV) is required. Patent Document 1 discloses an ultraviolet absorbing glass suitable as privacy glass for vehicles, having extremely low ultraviolet transmittance (TUV) of 2% or less at a sheet thickness of 3.5 mm.

PRIOR ART DOCUMENT

Patent Document

Patent Document 1: WO02015/088026

SUMMARY OF THE INVENTION

Problems that the Invention is to Solve

In recent years, it is required in privacy glass for vehicles to achieve extremely low ultraviolet transmittance and improve color expression of scenery viewed through the glass. For example, improvement of color expression of green of trees viewed through the glass can be required. To achieve this, it is considered to improve color rendering property on green color.

To respond to the above problems, the present invention has an object to provide an ultraviolet absorbing glass having significantly low ultraviolet transmittance and excellent color rendering property on green color and suitable as dark gray-colored glass for vehicles.

Means for Solving the Problems

To achieve the above-described object, the present invention provides an ultraviolet absorbing glass containing, in mass % based on oxides:

| | |
|---|---|
| $SiO_2$ | 66 to 75%, |
| $Na_2O$ | 10 to 20%, |
| CaO | 5 to 15%, |
| MgO | 0 to 6%, |
| $Al_2O_3$ | 0 to 5%, |
| $K_2O$ | 0 to 5%, |
| $Fe_2O_3$ | 0.7 to 3.5%, |
| FeO | 0.2 to 1%, |
| $TiO_2$ | 0.1 to 3.2%, |
| CoO | 0.01 to 0.04%, |
| Se | 0.005% or less, |
| $Cr_2O_3$ | 0.08% or less, and |
| NiO | 0.2% or less, | satisfying a Redox ([divalent iron ($Fe^{2+}$) in terms of $Fe_2O_3$]/[total of divalent iron ($Fe^{2+}$) in terms of $Fe_2O_3$ and trivalent iron ($Fe^{3+}$) in terms of $Fe_2O_3$]) being 15 to 40%, having an ultraviolet transmittance (TUV) specified by ISO 9050:2003 at a sheet thickness of 2.8 mm being 2% or less, having a visible light transmittance (TVA) based on a Standard Illuminant A at a sheet thickness of 2.8 mm being 10% or more and 30% or less, having an energy transmittance (TE) specified by JIS R3106:1998 at a sheet thickness of 2.8 mm being 30% or less, and having a ratio R14/R9 of a color rendering index specified by ISO 9050:1990 and JIS Z8726:1990 being 1.8 or more and a ratio R14/R1 thereof being 1.05 or more.

Advantageous Effect of the Invention

The ultraviolet absorbing glass of the present invention can achieve significantly low ultraviolet transmittance and improve color expression of green of trees viewed through the glass. The ultraviolet absorbing glass of the present invention is particularly preferred as rear-side glass, rear glass and roof glass for automobiles.

MODE FOR CARRYING OUT THE INVENTION

The ultraviolet absorbing glass of the present invention contains, in mass % based on oxides:

| | |
|---|---|
| $SiO_2$ | 66 to 75%, |
| $Na_2O$ | 10 to 20%, |
| CaO | 5 to 15%, |
| MgO | 0 to 6%, |
| $Al_2O_3$ | 0 to 5%, |
| $K_2O$ | 0 to 5%, |
| $Fe_2O_3$ | 0.7 to 3.5%, |
| FeO | 0.2 to 1%, |
| $TiO_2$ | 0.1 to 3.2%, |
| CoO | 0.01 to 0.04%, |
| Se | 0.005% or less, |
| $Cr_2O_3$ | 0.08% or less, and |
| NiO | 0.2% or less, | satisfying a Redox ([divalent iron ($Fe^{2+}$) in terms of $Fe_2O_3$]/[total of divalent iron ($Fe^{2+}$) in terms of $Fe_2O_3$ and trivalent iron ($Fe^{3+}$) in terms of $Fe_2O_3$]) being 15 to 40%, having an ultraviolet transmittance (TUV) specified by ISO 9050:2003 at a sheet thickness of 2.8 mm being 2% or less, having a visible light transmittance (TVA) based on a Standard Illuminant A at a sheet thickness of 2.8 mm being 10% or more and 30% or less, having an energy transmittance (TE) specified by JIS R3106:1998 at a sheet thickness of 2.8 mm being 30% or less, and having a ratio R14/R9 of a color rendering index specified by ISO 9050:1990 and JIS Z8726:1990 being 1.8 or more and a ratio R14/R1 thereof being 1.05 or more.

The above-described "to" indicating numerical ranges is used to mean that numerical values described before and after the "to" are included as the lower limit and the upper limit, and hereinafter in the present description, unless particularly otherwise indicated, "to" will be used in the same manner.

The reasons for containing the above-described components in the present invention are described below. Unless particularly otherwise indicated, % means mass %.

$SiO_2$ is a component forming a network and is an essential component. In the case where the $SiO_2$ content is 66% or more, weathering resistance is improved, and in the case where the content is 75% or less, viscosity does not become excessively high and this is favorable for a melting. The $SiO_2$ content is preferably 67% or more and more preferably 68% or more. The content is preferably 72% or less and more preferably 70% or less.

$Na_2O$ is a component accelerating the melting of raw materials and is an essential component. In the case where the $Na_2O$ content is 10% or more, the melting of raw materials is accelerated, and in the case where the content is 20% or less, weathering resistance is not deteriorated. The $Na_2O$ content is preferably 11% or more and more preferably 12% or more. The $Na_2O$ content is preferably 18% or less and more preferably 16% or less.

CaO is a component accelerating the melting of raw materials and improving weathering resistance, and is an essential component. In the case where the CaO content is 5% or more, the melting of raw materials is accelerated and weathering resistance is improved, and in the case where the content is 15% or less, devitrification is suppressed. The CaO content is preferably 6% or more and more preferably 7% or more. The CaO content is preferably 13% or less and more preferably 11% or less.

MgO is a component accelerating the melting of raw materials and improving weathering resistance, and is an optional component. In the case where the MgO content is 6% or less, devitrification is suppressed. The MgO content is preferably 5% or less, more preferably 4.6% or less and even more preferably 4% or less. In the case where MgO is contained, the MgO content is preferably 1% or more, more preferably 2% or more and even more preferably 3% or more.

$Al_2O_3$ is a component improving weathering resistance and is an optional component. In the case where the $Al_2O_3$ content is 5% or less, viscosity does not become excessively high, and this is favorable for a melting. The $Al_2O_3$ content is preferably 4% or less and more preferably 3% or less. In the case where $Al_2O_3$ is contained, the $Al_2O_3$ content is preferably 0.5% or more and more preferably 1% or more.

$K_2O$ is a component accelerating the melting of raw materials and is an optional component. In the case where the $K_2O$ content is 5% or less, damage on refractories of a melting furnace due to volatilization is suppressed. The $K_2O$ content is preferably 4% or less, more preferably 3% or less and even more preferably 2% or less. In the case where $K_2O$ is contained, the $K_2O$ content is preferably 0.1% or more and more preferably 0.3% or more.

$Fe_2O_3$ which is an oxide of trivalent iron is a component absorbing ultraviolet rays and is an essential component. Also, $Fe_2O_3$ is a component tinging glass with yellow. The $Fe_2O_3$ content is set to 0.7% or more since ultraviolet transmittance becomes excessively large in the case where the $Fe_2O_3$ content is lower than 0.7%. The $Fe_2O_3$ content is set to 3.5% or less since visible light transmittance becomes excessively small in the case where the content is too large. The $Fe_2O_3$ content is preferably 0.8% or more, more preferably 1.0% or more and even more preferably 1.5% or more. The $Fe_2O_3$ content is preferably 3% or less, more preferably 2.6% or less and even more preferably 2.2% or less.

FeO which is an oxide of divalent iron is a component absorbing thermal energy and is an essential component. In the case where the FeO content is 0.2% or more, sufficiently low solar radiation transmittance can be obtained. On the other hand, in the case where the FeO content is 1% or less, thermal efficiency during a melting is not deteriorated, and a molten glass is suppressed from staying at the bottom, far from a heating source, of a melting furnace. The FeO content is preferably 0.25% or more, more preferably 0.30% or more, even more preferably 0.35% or more and especially preferably 0.40% or more. The FeO content is preferably 0.9% or less, more preferably 0.8% or less, even more preferably 0.7% or less and especially preferably 0.6% or less.

In the ultraviolet absorbing glass of the present invention, Redox ([divalent iron ($Fe^{2+}$) in terms of $Fe_2O_3$]/[total of divalent iron ($Fe^{2+}$) in terms of $Fe_2O_3$ and trivalent iron ($Fe^{+3}$) in terms of $Fe_2O_3$]) is used as an index of a balance between visible light transmittance and solar radiation transmittance.

In the ultraviolet absorbing glass of the present invention, Redox is 15 to 40%. In the case where Redox is 15% or more, solar radiation transmittance does not become excessively large, and in the case where Redox is 40% or less, visible light transmittance does not become excessively small. In the ultraviolet absorbing glass of the present invention, Redox is preferably 18% or more, more preferably 20% or more and even more preferably 21% or more. Redox is preferably 37% or less, more preferably 35% or less, even more preferably 32% or less and especially preferably 29% or less.

$TiO_2$ is a component decreasing ultraviolet transmittance (TUV) and is an essential component. Also, $TiO_2$ has an effect of decreasing viscosity of a molten glass during a melting and makes it difficult for the molten glass to stay. The $TiO_2$ content is set to 0.1% or more since ultraviolet transmittance becomes excessively large in the case where the content is lower than 0.1%. The $TiO_2$ content is preferably 0.3% or more, more preferably 0.8% or more and even more preferably 0.85% or more. However, the $TiO_2$ content is set to 3.2% or less since visible light transmittance becomes excessively small in the case where the content is too large. In the case where the $TiO_2$ content is 3.2% or less, R14/R9 described later can be increased. The $TiO_2$ content is preferably 3.0% or less, more preferably 2.9% or less, even more preferably 2.7% or less, especially preferably 2.5% or less and most preferably 2.2% or less.

CoO is a component tinging glass with blue and is an essential component. In the case where the CoO content is 0.01% or more, the color of the glass is suppressed from being tinged with yellow, and in the case where the CoO content is 0.04% or less, visible light transmittance (TVA) does not become excessively low. The CoO content is preferably 0.012% or more, more preferably 0.014% or more, more preferably 0.016% or more, more preferably 0.017% or more, even more preferably 0.018% or more and especially preferably 0.020% or more. The CoO content is preferably 0.038% or less, more preferably 0.036% or less, even more preferably 0.032% or less and especially preferably 0.030% or less.

Se is not essential but can be contained for adjusting the color of glass. In the case where the Se content is 0.005% or less, the glass is suppressed from being tinged with yellow. Also, an influence that the glass is tinged with red is small.

Furthermore, R14/R1 and R14/R9 described later can be increased. The Se content is more preferably 0.004% or less, even more preferably 0.003% or less and especially preferably 0.002% or less.

$Cr_2O_3$ is a component decreasing visible light transmittance and also a component tinging glass with green and is an optional component in the ultraviolet absorbing glass of the present invention. In the case where the $Cr_2O_3$ content is 0.08% or less, visible light transmittance is suppressed from becoming excessively small. The $Cr_2O_3$ content is more preferably 0.06% or less, even more preferably 0.05% or less and especially preferably 0.04% or less.

NiO is an optional component that can tinge the glass with brown in the ultraviolet absorbing glass of the present invention. In the case where the NiO content is 0.2% or less, the glass is suppressed from being tinged with blue. The NiO content is preferably 0.17% or less, more preferably 0.15% or less, more preferably 0.10% or less, more preferably 0.05% or less, even more preferably 0.04% or less, especially preferably 0.03% or less and most preferably 0.02% or less.

In the ultraviolet absorbing glass of the present invention, the total iron content in terms of $Fe_2O_3$ (specifically, the total iron content containing FeO which is an oxide of divalent iron and $Fe_2O_3$ which is an oxide of trivalent iron; hereinafter also referred to as t-$Fe_2O_3$) is preferably 1.5% or more. In the case where the total iron content is 1.5% or more, ultraviolet transmittances (TUV380 and TUV400) can be decreased. Also, dominant wavelength (λD) can be lengthened. The t-$Fe_2O_3$ content is more preferably 1.8% or more, more preferably 1.9% or more, even more preferably 1.95% or more, especially preferably 2.0% or more and most preferably 2.2% or more. The t-$Fe_2O_3$ content is preferably 5.0% or less. In the case where the t-$Fe_2O_3$ content is 5.0% or less, TVA does not become excessively low. In the case where the t-$Fe_2O_3$ content is 5.0% or less, thermal efficiency during a melting is not deteriorated, and a molten glass is suppressed from staying at the bottom, far from a heating source, of a melting furnace. Therefore, meltability is fine. The t-$Fe_2O_3$ content is more preferably 4.0% or less, even more preferably 3.0% or less and especially preferably 2.5% or less.

In the actual production, a refining agent such as salt cake is used and, thus, $SO_3$ in an amount of generally about 0.05 to 0.5% and preferably 0.05 to 0.4% may be contained as the trace in the glass.

The ultraviolet absorbing glass of the present invention may further contain any of the oxides of B, Ba, Sr, Li, Zn, Pb, P, Zr, Bi and Sn other than the above-described components. Each content of those oxides may be 0 to 1 mass %. Those components may be contained in total preferably 1% or less, more preferably 0.7% or less, even more preferably 0.4% or less, especially preferably 0.2% or less and most preferably 0.1% or less.

Also, any of oxides of Sb and As, Cl and F may be contained. Those can be intentionally mixed from a melting accelerator or a refining agent. Alternatively, those can be contained as impurities in raw materials or cullet. The contents of each of those may be preferably 0 to 0.1 mass %, more preferably 0 to 0.05 mass % and even more preferably 0 to 0.01 mass %.

Also, any of the oxides of Mn, Cu, Mo, Nd and Er may be contained. The contents of each of those in terms of oxides ($MnO_2$, CuO, $MoO_3$, $Nd_2O_3$ and $Er_2O_3$) may be preferably 0 to 0.1 mass %, more preferably 0 to 0.05 mass % and even more preferably 0 to 0.01 mass %.

Also, the ultraviolet absorbing glass article of the present invention may contain $CeO_2$ in order to decrease ultraviolet transmittance (TUV). In the case where $CeO_2$ is contained, the $CeO_2$ content may be 0 to 1 mass %. $CeO_2$ may be contained preferably 0.7 mass % or less, more preferably 0.4 mass % or less, even more preferably 0.2 mass % or less and especially preferably 0.1 mass % or less. It is preferred that $CeO_2$ is not substantially contained in order to reduce cost of raw materials. The term "not substantially contained" used herein means that $CeO_2$ is not intentionally contained except for unavoidable impurities, and specifically means in the present invention that the $CeO_2$ content is 100 ppm or less in the glass.

It is preferred that ultraviolet absorbers such as oxides ($V_2O_5$ and $WO_3$) of V and W are not substantially contained. The term "not substantially contained" used herein means that those oxides are not intentionally contained except for unavoidable impurities, and specifically means that the contents of each of those oxides are 100 ppm or less in the glass.

The ultraviolet absorbing glass of the present invention is a glass having the above-described composition and has the following optical properties.

The ultraviolet transmittance (TUV) at a thickness of 2.8 mm is 2% or less and preferably 1% or less. The visible light transmittance (TVA) at a thickness of 2.8 mm is 10% or more and 30% or less. The visible light transmittance is preferably 12% or more and more preferably 15% or more. Also, the visible light transmittance is preferably 28% or less and more preferably 25% or less.

In addition to the above-described optical properties, the energy transmittance (TE) is 30% or less, preferably 28% or less, more preferably 25% or less and even more preferably 20% or less.

In addition to the above-described optical properties, the ultraviolet transmittance (TUV400) at a thickness of 2.8 mm is preferably 5% or less, more preferably 3% or less and even more preferably 2% or less.

Throughout the present description, the energy transmittance (TE) is obtained based on JIS R3106: 1998, the ultraviolet transmittance (TUV) is obtained based on ISO 9050:2003, and the ultraviolet transmittance (TUV400) is obtained based on ISO 13837:2008 convention A. Also, the visible light transmittance (TVA) is calculated based on Standard Illuminant A.

To improve color rendering property on green color in the ultraviolet absorbing glass of the present invention, in addition to the above-described optical properties, a ratio R14/R9 of a color rendering index specified by ISO 9050:1990 and JIS Z8726:1990 is 1.8 or more and a ratio R14/R1 thereof is 1.05 or more. Test color 14 shows green color of leaf of a tree and is 5GY4/4 in Munsell value. Test color 1 and test color 9 show a red color group which is a color on the opposite side of green color in the hue circle specified by ISO 9050:1990 and JIS Z8721:1993, respectively, and are 7.5R6/4 and 4.5R4/13 in Munsell value, respectively.

In the case where the R14/R9 is 1.8 or more and the R14/R1 is 1.05 or more, in the present invention, a coloring of green is improved while a coloring of red is suppressed, color rendering property on green color is improved, color expression of green of trees viewed through the glass can be improved, and green can be straightforwardly expressed. The R14/R9 is preferably 2.2 or more and more preferably 3 or more. The R14/R1 is preferably 1.1 or more and more preferably 1.15 or more. The R14/R9 is increased by decreasing the Se content and the $TiO_2$ content. The R14/R1 is increased by decreasing the Se content.

In the ultraviolet absorbing glass of the present invention, in the case where the value represented by the following formula (1) is A and the value represented by the following formula (2) is B, AB is preferably 1.8 or more.

$$-2.73[Fe_2O_3]-5.19[FeO]-0.85[TiO_2]+9.94[NiO]+28.48[Cr_2O_3]+231.19[CoO]-4169.28[Se]+913.24[TiO_2][Se]-1.71[Fe_2O_3][TiO_2]+100.71 \quad \text{formula (1)}$$

$$24.88[Fe_2O_3]-130.39[FeO]+21.54[TiO_2]-93.79[NiO]-782.99[Cr_2O_3]-1402.05[CoO]+29997.75[Se]-4613.21[TiO_2][Se]-5.01[Fe_2O_3][TiO_2]+60.53 \quad \text{formula (2)}$$

The expression of component surrounded by brackets used herein shows the content (mass % based on oxides) of the component contained in the ultraviolet absorbing glass (the same in the following description of the present description). A is an index of R14 of the ultraviolet absorbing glass, and B is an index of R9 thereof. In the present application, to make the R14/R9 1.8 or more, A/B is preferably 1.8 or more, more preferably 2.2 or more and even more preferably 3 or more.

In the ultraviolet absorbing glass of the present invention, when the value represented by the following formula (3) is C, A/C is preferably 1.05 or more.

$$6.07[Fe_2O_3]-37.46[FeO]+2.55[TiO_2]-4.27[NiO]-183.6[Cr_2O_3]-433.37[CoO]+6265.9[Se]-206.26[TiO_2][Se]-0.65[Fe_2O_3][TiO_2]+91.92 \quad \text{formula (3)}$$

C is an index of R1 of the ultraviolet absorbing glass. In the present application, to make the R14/R1 1.05 or more, A/C is preferably 1.05 or more, more preferably 1.1 or more, even more preferably 1.15 or more, especially preferably 1.2 or more and most preferably 1.25 or more.

In the ultraviolet absorbing glass of the present invention, dominant wavelength λD is preferably 570 nm or less at a thickness of 2.8 mm. The dominant wavelength λD used herein is dominant wavelength of transmitted light specified by JIS Z8701:1999. The λD is more preferably 560 nm or less, even more preferably 550 nm or less and especially preferably 540 nm or less. The λD is preferably 488 nm or more. The λD is more preferably 500 nm or more, even more preferably 510 nm or more, especially preferably 520 nm or more and most preferably 530 nm or more.

In the ultraviolet absorbing glass of the present invention, excitation purity Pe is preferably 25% or less at a thickness of 2.8 mm. The excitation purity Pe used herein is excitation purity specified by JIS Z8701:1999. In the case where the Pe is 25% or less, the glass has gray color closer to achromatic color. The Pe is more preferably 20% or less, more preferably 15% or less, more preferably 12% or less, even more preferably 10% or less, especially preferably 8% or less and most preferably 5% or less.

The ultraviolet absorbing glass of the present invention has the effect that in the case where a temperature T2 at which viscosity reaches $10^2$ poises is 1440° C. or lower, the glass is easy to be manufactured. The T2 is preferably 1435° C. or lower, more preferably 1410° C. or lower and especially preferably 1400° C. or lower.

The method for manufacturing the ultraviolet absorbing glass of the present invention is not particularly limited, but, for example, it can be manufactured as follows. Blended raw materials are continuously supplied to a melting furnace and are heated at about 1500° C. to be vitrified. Subsequently, this molten glass is refined and then formed into a glass sheet having a predetermined thickness by a float process or the like. Then, by cutting this glass sheet into a predetermined shape, the ultraviolet absorbing glass of the present invention is manufactured. Thereafter, as necessary, the cut glass can be subjected to a strengthening treatment such as a physical tempering, can be processed into laminated glass or can be processed into insulated glass.

EXAMPLES

In the following explanation, Examples 1 to 5 and 7 to 9 are Invention Examples, and Examples 6, 10 and 11 are Comparative Examples. A raw material batch was prepared by using silica sand, feldspar, dolomite, soda ash, salt cake, blast furnace slag, ferric oxide, titanium oxide, cobalt oxide, sodium selenite, chromium oxide and nickel oxide, as raw materials.

Soda-lime silicate glass containing $SiO_2$: 66 to 70, $Al_2O_3$: 1.8, CaO: 8.4, MgO: 4.6, $Na_2O$: 13.3, $K_2O$: 0.7 and $SO_3$: 0.2 (unit: mass % based on oxides), as basic components was used. The $SiO_2$ content was adjusted such that the total of the basic components and $Fe_2O_3$, $TiO_2$, CoO, Se, $Cr_2O_3$ and NiO which are added as optical components reaches 100 mass %, thereby producing a target composition.

The batch was placed in a crucible made of platinum-rhodium and melted in an electric furnace (in an atmosphere having $O_2$ concentration of about 0.5%). The molten glass was flowed out on a carbon plate and then annealed in another electric furnace. The obtained glass block was cut into pieces, some of the pieces were polished, and the composition thereof was analyzed by using a fluorescent X-ray analyzer (scanning fluorescent X-ray analyzer ZSX100e manufactured by Rigaku Corporation).

A surface of others of the pieces was polished into a mirror surface and finished such that a thickness is 2.8 mm, and spectral transmittance was measured with a spectrophotometer. FeO content was obtained by calculation from infrared transmittance at a wavelength of 1000 nm. $Fe_2O_3$ content was calculated based on total iron oxide content obtained by fluorescent X-ray analysis and the above-described FeO content.

Value A represented by the formula (1), value B represented by the formula (2) and value C represented by the formula (3) were obtained according to the above-described procedures.

Visible light transmittance (TVA), energy transmittance (TE), ultraviolet transmittance (TUV), ultraviolet transmittance (TUV400), dominant wavelength (λD) and excitation purity (Pe) were calculated based on the spectral transmittance. Furthermore, color rendering indexes R1, R9 and R14 on test colors 1, 9 and 14 for color rendering index calculation were obtained based on spectral transmittance by the methods according to ISO9050:1990 and JIS Z8726:1990.

The contents of absorbing components and optical properties of the obtained glasses are shown in Table 1 below.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| mass % | $Fe_2O_3$ | 2.07 | 2.06 | 2.11 | 1.82 | 0.86 | 1.21 | 2.24 | 1.46 | 1.45 | 0.81 | 0.80 |
| mass % | FeO | 0.55 | 0.57 | 0.52 | 0.48 | 0.22 | 0.35 | 0.53 | 0.48 | 0.49 | 0.22 | 0.19 |
| mass % | t-$Fe_2O_3$ | 2.68 | 2.69 | 2.69 | 2.35 | 1.10 | 1.60 | 2.84 | 1.99 | 1.99 | 1.05 | 1.01 |

TABLE 1-continued

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| mass % | TiO$_2$ | 1.12 | 1.12 | 1.12 | 0.89 | 2.41 | 0.06 | 0.55 | 0.53 | 0.52 | 3.28 | 3.28 |
| mass % | CoO | 0.0235 | 0.0303 | 0.0236 | 0.0279 | 0.0316 | 0.0210 | 0.0249 | 0.0345 | 0.0342 | 0.0301 | 0.0413 |
| mass % | Se | 0 | 0 | 0 | 0.0011 | 0.0017 | 0 | 0.001 | 0.0017 | 0.0023 | 0.0019 | 0.0016 |
| mass % | Cr$_2$O$_3$ | 0 | 0 | 0 | 0.0112 | 0.0412 | 0 | 0.0313 | 0.0312 | 0.0104 | 0.0057 | 0.0005 |
| mass % | NiO | 0.0235 | 0.0303 | 0.0359 | 0.0112 | 0.0005 | 0.0676 | 0.0332 | 0.0341 | 0.0042 | 0 | 0 |
| % | Redox | 22.8 | 23.5 | 21.5 | 22.7 | 22.2 | 24.3 | 21.1 | 26.8 | 27.1 | 23.3 | 20.9 |
| % | TVA | 23.7 | 19.8 | 22.7 | 18.2 | 20.5 | 23.2 | 15.8 | 14.4 | 15.7 | 22.6 | 19.0 |
| % | TE | 14.4 | 12.8 | 14.6 | 17.2 | 27.2 | 19.2 | 11.5 | 12.9 | 13.6 | 28.9 | 29.6 |
| % | TUV | 0.8 | 0.7 | 0.6 | 1.0 | 1.8 | 9.6 | 0.3 | 1.8 | 1.7 | 1.8 | 2.0 |
| % | TUV400 | 2.8 | 2.7 | 2.4 | 3.4 | 5.2 | 17.3 | 1.5 | 5.2 | 5.0 | 5.1 | 5.6 |
| nm | λD | 532 | 509 | 546 | 541 | 516 | 496 | 563 | 550 | 525 | 569 | 498 |
| % | Pe | 7.5 | 6.5 | 10.9 | 7.5 | 3.4 | 6.1 | 24.6 | 9.4 | 3.2 | 11.6 | 2.1 |
|  | R1 | 73.5 | 69.6 | 75.2 | 79.3 | 77.7 | 78.3 | 78.1 | 75.4 | 79.8 | 90.6 | 86.6 |
|  | R9 | 11.7 | 0.3 | 20.4 | 30.2 | 42.3 | 30.7 | 37.2 | 30.2 | 44.1 | 90.0 | 77.9 |
|  | R14 | 92.6 | 89.6 | 94.6 | 94.6 | 94.9 | 92.2 | 95.8 | 95.9 | 95.6 | 94.9 | 96.0 |
|  | R14/R1 | 1.26 | 1.29 | 1.26 | 1.19 | 1.22 | 1.18 | 1.23 | 1.27 | 1.20 | 1.05 | 1.11 |
|  | R14/R9 | 7.91 | 298.70 | 4.64 | 3.13 | 2.25 | 3.00 | 2.58 | 3.18 | 2.17 | 1.05 | 1.23 |
|  | A | 93.0 | 94.5 | 93.1 | 92.9 | 96.8 | 100.9 | 92.6 | 95.4 | 92.2 | 95.0 | 98.0 |
|  | B | 17.7 | 4.7 | 21.1 | 33.8 | 50.3 | 10.1 | 16.7 | 12.3 | 47.6 | 90.9 | 78.7 |
|  | C | 74.9 | 71.2 | 76.2 | 78.7 | 82.2 | 76.9 | 75.5 | 73.2 | 80.8 | 91.8 | 87.3 |
|  | A/B | 5.26 | 20.10 | 4.42 | 2.75 | 1.92 | 9.95 | 5.54 | 7.74 | 1.94 | 1.04 | 1.25 |
|  | A/C | 1.24 | 1.33 | 1.22 | 1.18 | 1.18 | 1.31 | 1.23 | 1.30 | 1.14 | 1.03 | 1.12 |

As shown in Table 1, the glasses of Examples 1 to 5 and 7 to 9 satisfying all of the requirements relating to the glass composition of the present invention satisfied the requirements relating to optical properties at a sheet thickness of 2.8 mm and the requirements relating to color rendering properties. The glass of Example 6 having the TiO$_2$ content of less than 0.1% did not satisfy the ultraviolet transmittance (TUV) of the optical properties at a sheet thickness of 2.8 mm. The glass of Example 10 having the TiO$_2$ content of more than 3.2% did not satisfy R14/R1 and R14/R9. The glass of Example 11 having the TiO$_2$ content of more than 3.2% did not satisfy R14/R9.

Although the present invention has been described in detail and by reference to the specific embodiments, it is apparent to one skilled in the art that various modifications or changes can be made without departing the spirit and scope of the present invention. This application is based on Japanese Patent Application (No. 2016-008693) filed Jan. 20, 2016 and Japanese Patent Application (No. 2016-088822) filed Apr. 27, 2016, the disclosures of which are incorporated herein by reference in their entirety. Furthermore, all references cited herein are incorporated in their entirety.

The invention claimed is:

1. An ultraviolet absorbing glass comprising, in mass % based on oxides:

| | |
|---|---|
| SiO$_2$ | 66 to 75%, |
| Na$_2$O | 10 to 20%, |
| CaO | 5 to 15%, |
| MgO | 0 to 6%, |
| Al$_2$O$_3$ | 0 to 5%, |
| K$_2$O | 0 to 5%, |
| Fe$_2$O$_3$ | 1.57 to 3.5%, |
| FeO | 0.36 to 1%, |
| TiO$_2$ | 0.1 to 3.2%, |
| CoO | 0.01 to 0.04%, |
| Se | 0.005% or less, |
| Cr$_2$O$_3$ | 0.08% or less, and |
| NiO | 0.2% or less, | having a total iron content in terms of Fe$_2$O$_3$ being from 2.68% to 4.61% in mass % based on oxides, satisfying a Redox ([divalent iron (Fe$^{2+}$) in terms of Fe$_2$O$_3$]/[total of divalent iron (Fe$^{2+}$) in terms of Fe$_2$O$_3$ and trivalent iron (Fe$^{3+}$) in terms of Fe$_2$O$_3$]) being 15 to 40%, having an ultraviolet transmittance (TUV) specified by ISO 9050:2003 at a sheet thickness of 2.8 mm being 2% or less, having a visible light transmittance (TVA) based on a Standard Illuminant A at a sheet thickness of 2.8 mm being 10% or more and 30% or less, having an energy transmittance (TE) specified by JIS R3106:1998 at a sheet thickness of 2.8 mm being 30% or less, and having a ratio R14/R9 of a color rendering index specified by ISO 9050:1990 and JIS Z8726:1990 being 1.8 or more and a ratio R14/R1 thereof being 1.05 or more.

2. The ultraviolet absorbing glass according to claim 1, having the TiO$_2$ content being 0.8 to 3.2% in mass % based on oxides.

3. The ultraviolet absorbing glass according to claim 1, having the CoO content being 0.01 to 0.038% in mass % based on oxides.

4. The ultraviolet absorbing glass according to claim 1, having the CoO content being 0.018 to 0.04% in mass % based on oxides.

5. The ultraviolet absorbing glass according to claim 1, having the Fe$_2$O$_3$ content being 1.82 to 3.5% in mass % based on oxides.

6. The ultraviolet absorbing glass according to claim 1, having the Fe$_2$O$_3$ content being 2.06 to 3.5% in mass % based on oxides.

7. The ultraviolet absorbing glass according to claim 1, having the FeO content being 0.40 to 1% in mass % based on oxides.

8. The ultraviolet absorbing glass according to claim 1, satisfying A/B being 1.8 or more and A/C being 1.05 or more, wherein:

the A indicates $$-2.73[Fe_2O_3]-5.19[FeO]-0.85[TiO_2]+9.94[NiO]+28.48[Cr_2O_3]+231.19[CoO]-4169.28[Se]+913.24[TiO_2][Se]-1.71[Fe_2O_3][TiO_2]+100.71;$$

the B indicates $24.88[Fe_2O_3]-130.39[FeO]+21.54[TiO_2]-93.79[NiO]-782.99[Cr_2O_3]-1402.05[CoO]+29997.75[Se]-4613.21[TiO_2][Se]-5.01[Fe_2O_3][TiO_2]+60.53$; and the C indicates $6.07[Fe_2O_3]-37.46[FeO]+2.55[TiO_2]-4.27[NiO]-183.6[Cr_2O_3]-433.37[CoO]+6265.9[Se]-206.26[TiO_2][Se]-0.65[Fe_2O_3][TiO_2]+91.92$, wherein an expression of a component surrounded by brackets shows a content (mass % based on oxides) of the component contained in the ultraviolet absorbing glass.

9. The ultraviolet absorbing glass according to claim 1, having an ultraviolet transmittance (TUV400) specified by ISO 13837:2008 convention A at a sheet thickness of 2.8 mm being 5% or less.

10. The ultraviolet absorbing glass according to claim 1, wherein the ultraviolet transmittance (TUV) specified by ISO 9050:2003 at a sheet thickness of 2.8 mm is 1% or less.

11. The ultraviolet absorbing glass according to claim 1, wherein the visible light transmittance (TVA) based on the Standard Illuminant A at a sheet thickness of 2.8 mm is 12 to 28%.

12. The ultraviolet absorbing glass according to claim 1, having a dominant wavelength (XD) specified by JIS Z8701:1999 at a sheet thickness of 2.8 mm being 500 nm or more.

* * * * *